Aug. 8, 1972  H. T. FINDLAY ET AL  3,682,764
HIGH IMPACT RIBBONS
Filed Feb. 17, 1970

INVENTORS.
HUGH T. FINDLAY
STERRITT R. FULLER, JR.
JERRY F. STONE

BY *David M. Bunnell*
ATTORNEY.

United States Patent Office 3,682,764
Patented Aug. 8, 1972

3,682,764
HIGH IMPACT RIBBONS
Hugh T. Findlay, Sterritt R. Fuller, Jr., and Jerry F. Stone, Lexington, Ky., assignors to International Business Machines Corporation, Armonk, N.Y.
Filed Feb. 17, 1970, Ser. No. 12,007
Int. Cl. B32b 5/18, 27/34; C09j 3/12
U.S. Cl. 161—160      1 Claim

ABSTRACT OF THE DISCLOSURE

High impact ribbons comprise a transfer layer of a porous resin matrix containing expressible ink and a second polymer film backing layer coextensive with and bonded to the back surface of the transfer layer by a thin intermediate layer of elastomeric adhesive polymer.

BACKGROUND OF THE INVENTION

This invention relates generally to transfer media and more particularly to typewriter ribbons having a porous polymer matrix transfer layer.

Certain problems exist in the area of plastic matrix typewriter ribbons. For example, reuseable matrix ribbons show either breakdown of the polymer matrix or cutting of the backing layer prior to ink depletion. Cut resistance can be improved by increasing the caliper of the ribbon but this has the effect of degrading the print quality. The transfer of large solid particles of the ribbon to the copy paper, which results in a significant distortion of the type face image known as "picking," ranges from a moderate to a severe problem. Also, separation of the porous layer from the support layer sometimes occurs prior to depletion of the ink such that a portion of the ink is wasted.

BRIEF DESCRIPTION OF THE INVENTION

In accordance with this invention, a transfer medium has been found which has unexpectedly superior properties of cut and pick resistance. The transfer medium comprises a porous resin matrix transfer layer containing expressible ink in the pores and a backing layer coextensive with and bonded to the back surface of the transfer layer by a thin intermediate layer of an elastomeric polymer adhesive.

DETAILED DESCRIPTION

Elastomeric adhesives are sandwiched between a matrix transfer layer and a supporting layer. Suitable matrix transfer layers are well known in the art and are described, for example, in United States Patents 3,413,184 and 3,413,183. Suitable support layers are, for example, polymer films or other flexible materials which will give good conformation to a typeface. With this approach, the impacted adhesive material is capable of stretching along with the polymer layers. This assures continuous adhesion under the most extreme conditions of elongation at point of impact. Non-elastic adhesive materials such as paraffin wax or the dual use of solvent employed in the prior art give poor results in this regard.

Therefore, adhesives with relatively high elastomeric properties, for example, acrylonitrile-butadiene, ethylene acetate copolymer, polyisoprene, polybutylene, styrene-butadiene copolymer and mixtures thereof can be successfully employed as an adhesive layer between the support film and porous layer. Particularly, advantageous results occur when the adhesive is an acrylonitrile-butadiene polymer with a nitrile content of about 15–45 percent by weight or a combination of acrylonitrile-butadiene mixed with a styrene butadiene copolymer. Useful adhesive polymers are adhesive materials which without plasticization and within the temperature range of 10° C. to 50° C. are capable of large deformation upon the application of stress without rupture and which can recover spontaneously and almost completely upon removal of stress.

Performance is excellent with respect to adhesion up to and beyond the elastic limit of the polymer comprising the matrix and backing layers. However, it is also observed that unexpected cut and pick resistance is obtained. The magnitude of the improvement is demonstrated by comparing low impact nylon matrix ribbon material with high impact porous nylon ribbons of this construction. Low impact nylon matrix ribbon material is designed for limited overstrikes on a typewriter and this ribbon material in high impact applications quickly breaks down. However, it is found that when the material is sandwiched with an acrylonitrile-butadiene adhesive to a nylon support layer, the ribbon performed on the level equivalent to the best high impact ribbons previously known. Therefore, ribbons have been considered impossible to use in high impact applications now are adequate when the ribbon structure is modified according to this invention. As an illustration the following comparison can be drawn as shown in Table I.

TABLE I

| | | No. of over strikes | Results |
|---|---|---|---|
| A | Low impact nylon matrix ribbon | 3 | Cuts, picks, folds, embosses. |
| B | Low impact nylon matrix layer plus paraffin wax adhesive plus nylon 6 film backing. | 10 | Do. |
| C | Low impact nylon matrix layer plus acrylonitrile butadiene adhesive plus nylon 6 film backing layer. | 25 | No cutting, no picking, no folding, reduced embossing. |

Figure 2:
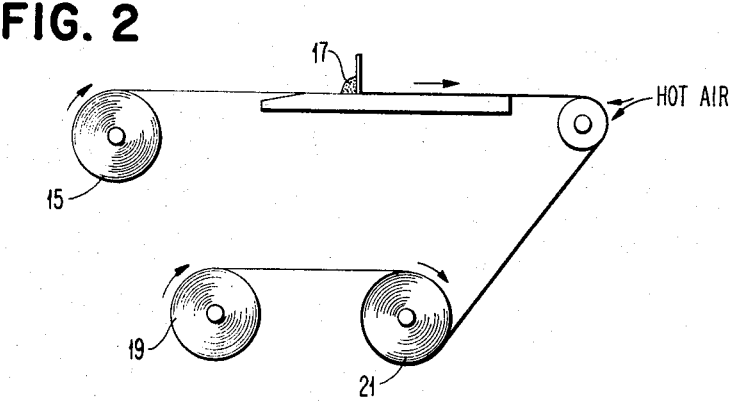
Figure 1:
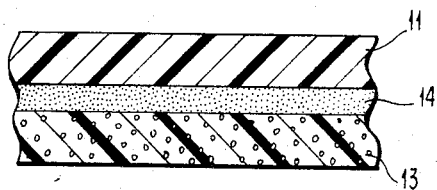
FIG. 1 is a cross sectional view with parts broken away of a ribbon of the invention.

FIG. 2 is a highly schematic representation of an apparatus suitable for preparing the transfer media shown in FIG. 1.

Figure 3:
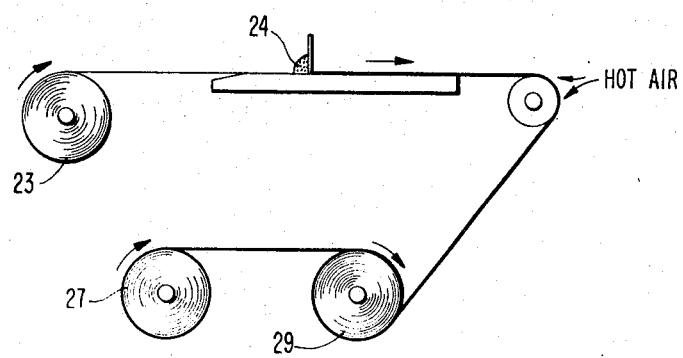

FIG. 3 is a highly schematic diagram of an apparatus for preparing the embodiment of the invention described in Example 2.

Figure 4:
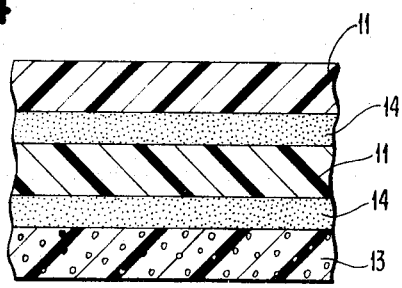

FIG. 4 is a cross sectional view with parts broken away of a ribbon prepared in accordance with Example 2.

Sample A was a low impact nylon matrix ribbon prepared in accordance with the process described in U.S. Patent 3,413,184 having a nylon backing layer solvent coated onto the ribbon and a caliper of .0013 inch. Sample B consisted of a low impact nylon matrix layer .0013 inch in thickness bonded by a paraffin wax adhesive layer .0005 inch in thickness to a nylon 6 film backing layer .0015 inch in thickness. Sample C consisted of a .0013 inch thick low impact nylon matrix layer bonded to a .0015 inch thick nylon 6 film backing layer by an intermediate layer .0005 inch in thickness of an acrylonitrile-butadiene polymer adhesive. The structure of sample C is shown in cross section in FIG. 1 where 11 is the nylon film which is bonded to the nylon matrix ribbon 13 by adhesive layer 14.

The tests were performed on an IBM Model D typewriter at an impact setting of 10A for a single sheet. As shown in the table, ribbon samples A and B are inadequate for high impact applications because of any one of the listed failures of cutting, picking and folding. Sample C which has the structure of the invention was adequate as to all four properties. Differences in results between sample B and C are related to the change in adhesive layer from paraffin wax to an acrylonitrile-butadiene elastomeric polymer. The nylon 6 film stretches beyond the limit of the wax adhesive layer at the point of type impact. Thus, only the nylon 6 film and the adjacent surface of the nylon matrix layer remain in contact under the extremes of stretch and impact. Therefore, the paraffin adhesive breaks down and "picking" becomes increasingly evident with repeated use. The unexpected novel "picking" improvement is, therefore, related to the use of an elastomeric adhesive intermediate layer.

Subjective tests under extreme conditions of typing thus produced superior results in print, embossing and column strength over commercial type polymer matrix ribbons of similar caliper. It is believed that the elastic layers and the successive film layers complement each other to absorb the shock of type impact and yet permit good type face conformity and elastic recovery. Elastomeric binding layers of between about .0001 to .0010 inch in thickness can be conveniently used.

The foregoing features of the invention are further illustrated by but are not intended to be limited to the following examples wherein parts are parts by weight unless otherwise indicated.

Example 1

A nylon matrix ribbon of 0.0013" caliper was prepared in roll form 15 as described in Patent 3,413,184 Example II. A 20% by weight solution of acrylonitrile-butadiene 17 (Chemigum #608 from Goodyear Chemical Co.) in toluene was prepared. Following standard coating and drying procedures, a ½ mil layer of acrylonitrile-butadiene (after drying) was deposited on the nylon backed surface of the matrix ribbon as illustrated in FIG. 2. After drying the acrylonitrile-butadiene deposit with hot air and prior to wind up, a ½ to 1 mil nylon 6 film 19 was fed into the nip of take-up roll 21. The tacky surface of the acrylonitrile-butadiene bonded itself to the nylon 6 film. The roll 19 of bonded nylon and nylon matrix was slit to the width of typewriter ribbons without further processing.

As a preferred structure, one more additional bonded layer is added to the ribbon because of the significant additional gain which is realized in cut resistance as illustrated in Example 2. The addition layer or layers of nylon are preferentially coated independently.

Example 2

As illustrated in FIG. 3, approximately ½ mil of acrylonitrile-butadiene 24 was applied to a ½ to 1 mil nylon 6 film 23. As in Example 1, prior to windup, the nylon and nylon matrix bonded roll 27 was fed into the roll nip 29. The nylon 6 side of the nylon and nylon matrix material was so placed that contact was made and bonding occurred with the acrylonitrile-butadiene coated side of the newly coated nylon film. The cross section of the ribbon obtained is shown in FIG. 4.

Example 3

In order to illustrate a two component adhesive intermediate layer which significantly upgrades cutting performance, an acrylonitrile-butadiene (Chemigum N612B Goodyear Chemical Company) of a relatively low molecular weight polymer of medium nitrile content (22% to 36%) was used in combination with a styrene-butadiene polymer (Pliolite S5A Goodyear Chemical Company). The two adhesive materials were blended in toluene by mixing 20 parts by weight of acrylonitrile-butadiene and 4 parts by weight of styrene-butadiene into 76 parts by weight of toluene by high speed stirring until the polymers were dissolved. Two-three ply ribbon samples were prepared using the above adhesive solution in accordance with the procedures described in Examples 1 and 2. The first sample had as a backing layer a polyurethane film (Tuftane 310—B. F. Goodyear Chemical Company) and a low impact nylon matrix ribbon and the second has as the backing layer a rubber hydrochloride (Pliofilm NW—Goodyear Chemical Company) and a low impact nylon matrix ribbon. The pertinent performance data is shown in Table II.

TABLE II

| Test | Tuftane 310 plus Chemigum N612B | Tuftane 310 plus Chemigum N612B plus Pliolite S5A | Pliofilm MW plus Chemigum N612B plus Pliolite S5A |
|---|---|---|---|
| Cutting at 700 Char/in | (1) | (2) | None |
| Picking | 165 | None | None |
| Cut test dev | 21 | 29+ | 29 |
| Column strength, gms | 9 | 12 | 90 |
| Caliper, mil | 2.8 | 2.8 | 3.0 |

1 Very severe.
2 Very slight.

It can be seen that the samples prepared in accordance with Example 3 had excellent properties. Omitting the Pliolite gave a ribbon having poor properties as illustrated in the left-hand column of Table II.

With respect to the multi layer laminates, it was also found that the dimensional stability of the ribbon under impact could be improved by employing as an additional intermediate layer, between the relatively soft nylon or polyurethane backing layer and the nylon matrix layer, a relatively stiff polymer layer of, for example, ethylene-propylene copolymer bonded to the backing layer and to the matrix layer on each side by intermediate elastomeric adhesive layers. The intermediate positioning of the stiff polymer layer was found to be critical because although placement of the relatively stiff copolymer layer in the outside backing position was found to give the desired dimensional stability, it resulted in an unsatisfactory print intensity due to a lack of conformity of the ribbon with the type face.

The foregoing has described novel matrix ribbon constructions which overcome the disabilities previously encountered with the relatively soft nylon matrix ribbons. Elastomeric adhesive not only insuring a good bond between the supporting film and the matrix layer but the ribbons of the invention have outstanding and unexpected cut and pick resistance improvement. Accordingly, standard low impact nylon matrix ribbons are upgraded to a "non-picking" structure when incorporated into the invention. Additionally, the expected broading of print usually associated with high caliper, 0.003" or more ribbons, is not observed in the ribbon structures prepared in accordance with the invention which is believed to be a function of the compressibility of the binders employed in the invention.

We claim:
1. A transfer medium comprising a porous resin matrix transfer layer containing expressible ink and a polymer film backing layer coextensive with and bonded to the back surface of said transfer layer by a 0.0001 to 0.0010 inch thick intermediate layer of an elastomeric polymer adhesive wherein said resin matrix layer is nylon and said adhesive is acrylonitrile-butadiene.

References Cited

UNITED STATES PATENTS

| 3,330,791 | 7/1967 | Mater et al. | 260—28 |
| 3,037,879 | 6/1962 | Newman et al. | 117—36.1 |
| 3,348,651 | 10/1967 | Mater et al. | 197—172 |
| 3,413,184 | 11/1968 | Findlay et al. | 161—160 |

ROBERT F. BURNETT, Primary Examiner

R. A. DAWSON, Assistant Examiner

U.S. Cl. X.R.

117—36.1, 36.4; 156—331, 334; 161—165, 227, 255; 197—172